US010333369B2

(12) United States Patent
Wang et al.

(10) Patent No.: US 10,333,369 B2
(45) Date of Patent: Jun. 25, 2019

(54) MOTOR DRIVING ASSEMBLY AND TORQUE TRANSMISSION MECHANISM (71) Applicant: JOHNSON ELECTRIC INTERNATIONAL AG, Murten (CH)

(72) Inventors: Patrick Shui Chung Wang, Hong Kong (CN); Yue Li, Hong Kong (CN)

(73) Assignee: JOHNSON ELECTRIC INTERNATIONAL AG, Murten (CH)

(*) Notice: Subject to any disclaimer, the term of this patent is extended or adjusted under 35 U.S.C. 154(b) by 129 days.

(21) Appl. No.: 15/229,833

(22) Filed: Aug. 5, 2016

(65) Prior Publication Data
US 2017/0040869 A1 Feb. 9, 2017

(30) Foreign Application Priority Data

Aug. 6, 2015 (CN) .......................... 2015 1 0477361

(51) Int. Cl.
*H02K 7/10* (2006.01)
*H02K 21/02* (2006.01)
*H02K 11/04* (2016.01)
*H02K 5/24* (2006.01)
*H02K 11/215* (2016.01)
*F16H 41/00* (2006.01)
(Continued)

(52) U.S. Cl.
CPC ............... *H02K 7/10* (2013.01); *F16F 1/024* (2013.01); *F16F 15/1213* (2013.01); *F16H 41/00* (2013.01); *H02K 5/24* (2013.01); *H02K 7/108* (2013.01); *H02K 7/118* (2013.01); *H02K 11/044* (2013.01); *H02K 11/215* (2016.01); *H02K 21/02* (2013.01); *H02P 1/465* (2013.01); *H02P 6/20* (2013.01); *H02P 6/26* (2016.02); *F16F 1/10* (2013.01)

(58) Field of Classification Search
CPC ............ H02K 5/24; H02K 7/10; H02K 7/108; H02K 11/044; H02K 11/215; H02K 7/118; H02K 21/02; H02P 1/465; H02P 6/26; H02P 6/20; F16H 41/00; F16F 1/10; F16F 1/024; F16F 15/1213
USPC ............................................. 310/51; 464/82
See application file for complete search history.

(56) References Cited

U.S. PATENT DOCUMENTS 2,995,907 A * 8/1961 Orain ...................... F16D 3/76
  464/90
3,404,544 A * 10/1968 Fawick .................... F16D 3/74
  464/87
(Continued)

FOREIGN PATENT DOCUMENTS

DE       4320073 A1     12/1994

*Primary Examiner* — John K Kim
(74) *Attorney, Agent, or Firm* — Muncy, Geissler, Olds & Lowe, P.C.

(57) ABSTRACT

A motor driving assembly includes a single phase motor and a torque transmission mechanism. The torque transmission mechanism includes a driving member being driven by the motor, a driven member for driving a load to rotate along a predetermined direction, and a connecting device comprising a resilient member and a damping member. The resilient member includes one end connected to the driving member and the other end connected to the driven member. The damping member is coated on or attached over the resilient member, or filled in a gap of the resilient member, or the resilient member is made from a damping material in order to reduce noise produced by the resilient member.

12 Claims, 5 Drawing Sheets (51) Int. Cl.
*F16F 15/121* (2006.01)
*H02P 1/46* (2006.01)
*H02P 6/20* (2016.01)
*H02K 7/108* (2006.01)
*H02K 7/118* (2006.01)
*H02P 6/26* (2016.01)
*F16F 1/02* (2006.01)
*F16F 1/10* (2006.01)

(56) References Cited

U.S. PATENT DOCUMENTS

| | | | | |
|---|---|---|---|---|
| 5,040,651 | A * | 8/1991 | Hampton | F01L 1/34409 123/90.15 |
| 5,181,484 | A * | 1/1993 | Kan | F01L 1/34406 123/90.17 |
| 5,908,095 | A * | 6/1999 | Jackel | F16F 1/042 192/207 |
| 2004/0245887 | A1* | 12/2004 | Fujinaka | H02K 1/146 310/216.114 |
| 2005/0058559 | A1* | 3/2005 | Kasahara | F04D 29/263 417/423.7 |
| 2011/0115462 | A1* | 5/2011 | Babcock | H02P 7/281 323/351 |
| 2017/0040869 | A1* | 2/2017 | Wang | H02K 11/215 |

* cited by examiner

MOTOR DRIVING ASSEMBLY AND TORQUE TRANSMISSION MECHANISM

CROSS REFERENCE TO RELATED APPLICATIONS

This non-provisional patent application claims priority under 35 U.S.C. § 119(a) from Patent Application No. 201510477361.X filed in The People's Republic of China on Aug. 6, 2015.

FIELD OF THE INVENTION

The present invention relates to motors, and in particular to a single phase motor assembly for starting and driving a large load.

BACKGROUND OF THE INVENTION

When the rotational inertia of a load is too large, startup of the motor may fail because the motor cannot provide sufficient rotation torque at the moment of startup, and the motor may also be damaged in such situation.

When the motor is a single phase motor which usually has a small output torque, the above situation can more easily occur.

SUMMARY OF THE INVENTION

Thus, there is a desire for a motor driving assembly which can drive a large load by using a single phase motor.

In one aspect, the present invention provides a motor driving assembly which includes a single phase motor and a torque transmission mechanism. The torque transmission mechanism includes a driving member for being driven by the motor, a driven member for driving a load to rotate along a predetermined direction, and a connecting device comprising a resilient member and a damping member. The resilient member includes one end connected to the driving member and the other end connected to the driven member. The damping member is coated on or attached over the resilient member, or filled in void of the resilient member, in order to reduce noise produced by the resilient member.

Preferably, the single phase motor is a single phase permanent magnet direct current brushless motor or a single phase permanent magnet synchronous motor.

Preferably, the driving member and the driven member cooperatively form a receiving space, and the resilient member is a spiral spring received in the receiving space.

Preferably, the motor comprises an output shaft, the driving member is connected to an output shaft of the motor for synchronous rotation therewith, the driving member defines a receiving slot, and the one end of the resilient member is received in the receiving slot.

Preferably, the driven member defines a receiving slot, and the one end of the resilient member is received in the receiving slot.

Preferably, the single phase motor further comprises a startup circuit. The stator includes a stator winding. The stator winding and an external AC power are connected in series between a first node and a second node. The driving circuit includes a bidirectional AC switch, an AC-DC conversion circuit connected between the first node and the second node in parallel with the bidirectional AC switch, a position sensor, and a switch control circuit. No electrical current flows through the AC-DC conversion circuit when the bidirectional AC switch is turned on because the first node and the second node are short-circuited. The switch control circuit is configured to control the bidirectional AC switch to switch between turn-on and turn-off states of a positive half wave or a negative half wave according to a predetermined manner according to rotor magnetic pole position information detected by the position sensor and polarity information of the external AC power, such that the stator winding drives the rotor to rotate only along a predetermined startup direction during a startup period of the motor.

Preferably, the rotor comprises a plurality of permanent magnetic poles, the stator comprises a stator core and a stator winding wound around the stator core, the stator core comprises a plurality of stator teeth, each of the stator teeth comprises a tooth surface facing the rotor permanent magnetic pole, the tooth surface comprises a first section which is coaxial with the rotor and a second section forming a positioning slot such that the rotor is capable of stopping at an initial position which deviates from a dead point.

Preferably, the rotor is of an outer rotor type and includes a plurality of permanent magnetic poles. The stator includes a stator core and a stator winding wound around the stator core. The stator core includes a plurality of stator tooth. Each of the stator teeth includes a tooth surface facing the rotor permanent magnetic pole. An uneven air gap is formed between the permanent magnetic poles and the stator tooth face, and the air gap at each of the magnetic poles is symmetrical about a center line of the each of the magnetic poles.

Preferably, the air gap at each of the magnetic poles has a radial width gradually increasing from a center to two ends of the each of the magnetic poles.

In another aspect, a torque transmission mechanism is provided which includes a driving member for being driven by an external force, a driven member for driving a load to rotate along a predetermined direction, and a connecting device including a resilient member and a damping member. The resilient member includes one end connected to the driving member and the other end connected to the driven member. The damping member is coated on or attached over the resilient member, or filled in void of the resilient member.

Preferably, the driving member and the driven member cooperatively form a receiving space, and the resilient member is a spiral spring received in the receiving space.

Preferably, the driving member forms a first receiving slot, the one end of the resilient member is received in the first receiving slot, the driven member forms a second receiving slot, and the other end of the resilient member is received in the second receiving slot.

The present invention further comprises an electric apparatus comprising a fluid generating device comprising a plurality of blades; and a driving assembly for driving the fluid generating device to rotate.

The torque transmission mechanism of the present invention can provide a buffering function at the phase of startup of the motor, thus avoiding startup failure of the motor, preventing the motor from being damaged, and effectively reducing the noise from the source.

DETAILED DESCRIPTION OF THE PREFERRED EMBODIMENTS

Referring to FIG. 1 to FIG. 5, a motor driving assembly in accordance with a first embodiment of the present invention includes a single phase motor 10 and a torque transmission mechanism 30.

Figure 1:
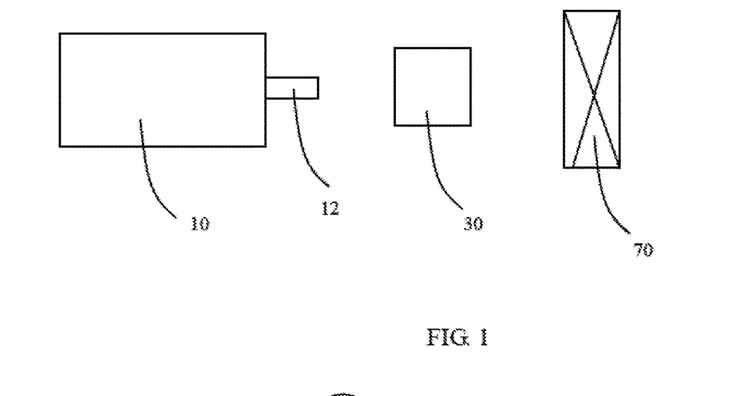
FIG. 1 is a simplified view of a motor driving assembly according to one embodiment of the present invention.

The single phase motor 10 is preferably a single phase permanent magnet direct current brushless motor or a single phase permanent magnet synchronous motor, which includes an output shaft 12.

The torque transmission mechanism 30 includes a driving member 40 configured to be driven by the output shaft 12 of the motor, a driven member 50 for driving a load along a predetermined direction, and a connecting device 60. The connecting device 60 includes a resilient member 62 and a damping member 64. The resilient member 62 has one end 68 connected to the driving member 40 and the other end 69 connected to the driven member 50. The damping member 64 is coated on or attached around the resilient member 62 or is filled in a gap of the resilient member 62 to reduce noise produced by the resilient member 62.

Figure 2:
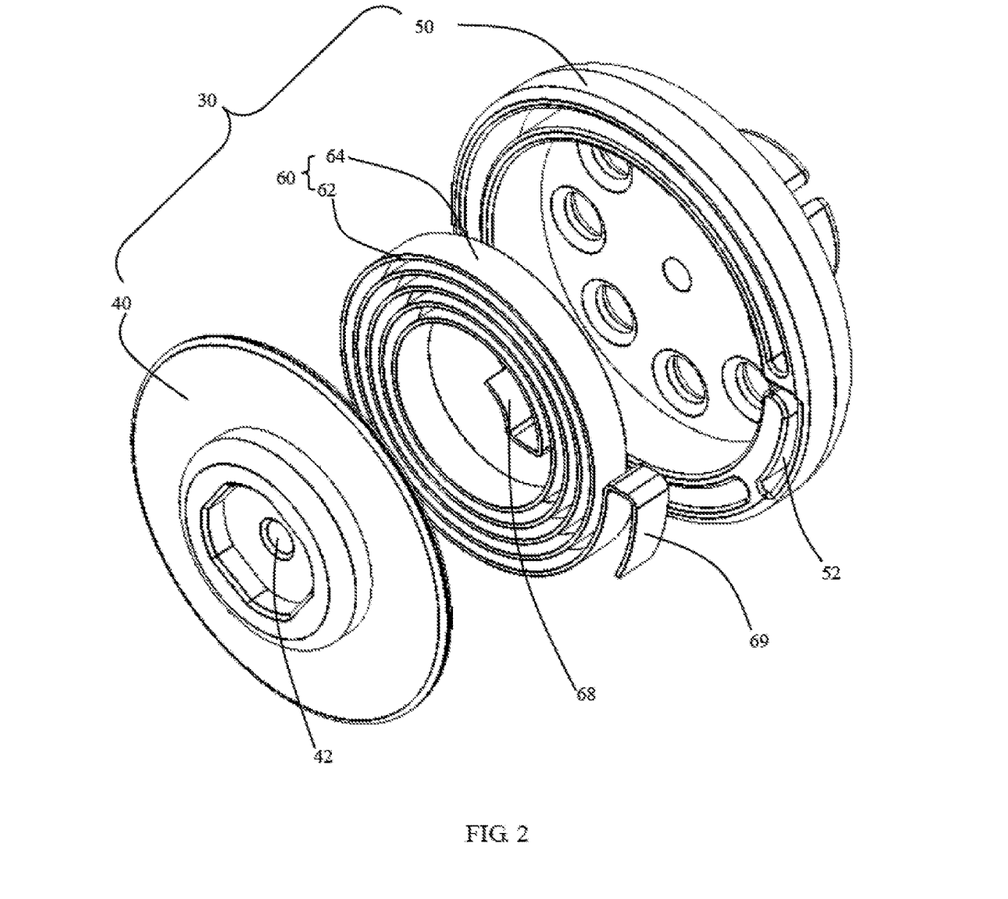
FIG. 2 is a perspective view of a torque transmission mechanism utilized in the motor driving assembly of FIG. 1.
Figure 4:
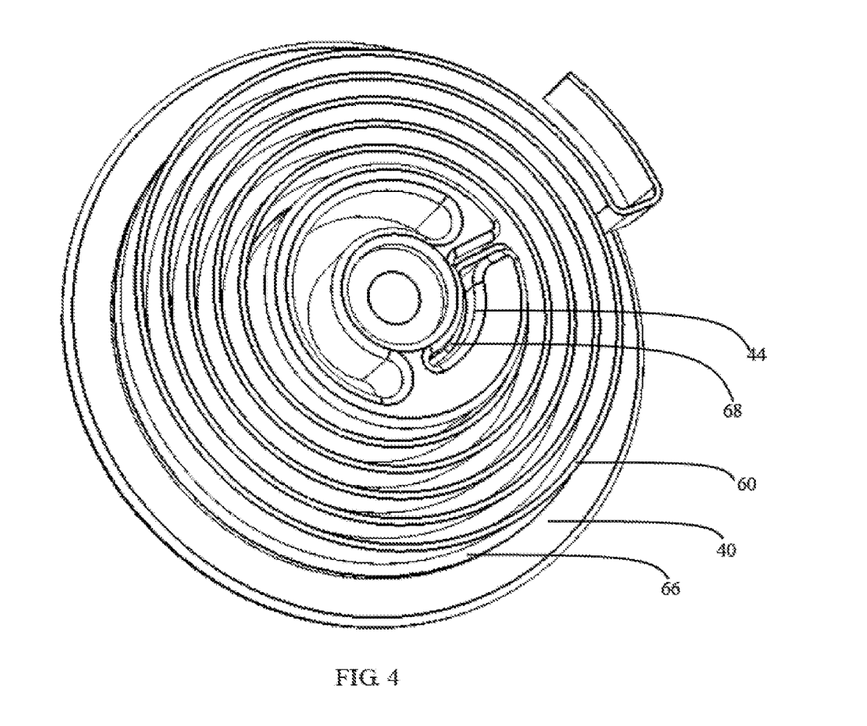
FIG. 4 is a perspective view of the driving member and a connecting device of the torque transmission mechanism of FIG. 2.
Figure 5:
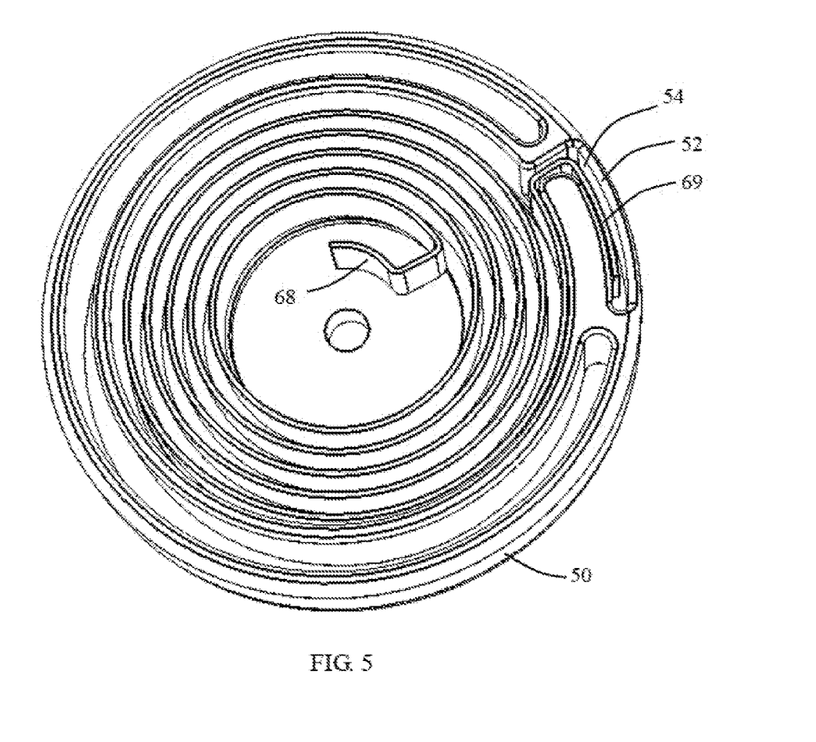
FIG. 5 is a perspective view of a driven member and the connecting device of the torque transmission mechanism of FIG. 2.

In this embodiment, at least one of the driving member 40 and the driven member 50 is plate-shaped or disc-shaped with a flange, and the driving member 40 and the driven member 50 cooperatively form a receiving space there between. The resilient member 62 is a spiral spring with a plurality of rings received in the receiving space. Preferably, one or more elastic pads 66 is disposed between one of two axial sides of the spring 62 and one of contact surfaces of the driving member 40 and driven member 50 in order to reduce axial play of the spring 62 in the receiving space to thereby reduce noise. Understandably, elastic pad 66 may be disposed between both axial sides of the spring 62 and contact surfaces of the driving member 40 and driven member 50 respectively.

The damping member 64 may be a damping layer coated on an outer surface of the resilient member 62, a damping mud or damping rubber filled in gaps/spaces formed between rings of the spring 62, a damping sleeve directly attached over the resilient member 62, or a damping wire or strip wound around the resilient member 62.

Figure 3:
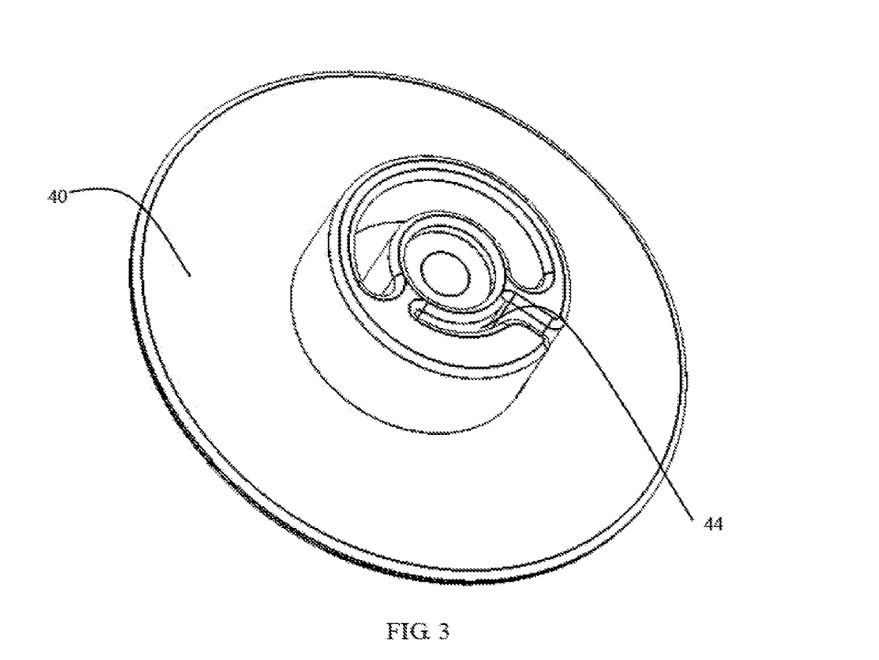
FIG. 3 is a perspective view of a driving member of the torque transmission mechanism of FIG. 2.

The driving member 40 is connected to the output shaft 12 of the motor for synchronous rotation therewith. Specifically, the driving member 40 defines an axial hole 42, and the output shaft 12 of the motor passes through the axial hole 42. The output shaft 12 of the motor and the axial hole 42 may be connected by interference-fit/press fit or in another fixed connecting manner to transmit torque. A receiving slot 44 is formed in one side of the driving member 40 toward the driven member 50. In this embodiment, the receiving slot 44 extends along a circumferential direction. The one end 68 of the resilient member 62 is received in the receiving slot 44.

In this embodiment, an annular flange 52 is formed at an outer edge of the driven member 50. The annular flange 52 surrounds a cavity for receiving the spring 62. The flange 52 defines a receiving slot 54 in which the other end 69 of the spring 62 is received. The flange 52 of the driving member 50 defines a slot for reducing the material and therefore weight of the driven member 50.

In operation of the motor 10, one end 68 of the spring 62 and the driving member 40 rotate along with the output shaft 12 of the motor, which makes the spring 62 start storing energy. When the energy stored by the spring 62 reaches a predetermined amount, the other end 69 of the spring 62 drives the driven member 50 to rotate, thus driving the load 70 connected with the driven member 50 to rotate together. When the rotation speed of the load 70 is equal to the rotation speed of the output shaft 12 of the motor, the spring 62 maintains in a stable tension state.

When the motor drives a load with a larger moment of inertia, in order to address the startup failure problem due to the fact that the output torque of the motor is not large enough to drive the load at the beginning of the startup, the present invention allows the driving shaft 12 to slip relative to the load 70 at the beginning of the motor startup. Only when the output torque of the motor reaches a certain value, the motor drives the load 70 to rotate via the load connecting mechanism 30, such that the motor can be successfully started and drive the load with larger moment of inertia. In addition, by utilizing the motor driving assembly and its torque transmission mechanism provided by the present invention, there is no need to increase the size of the motor, and the power loss caused by other startup manner is also reduced. Furthermore, because the spring 62 is coated or wrapped with the damping member, vibration of the spring 62 can be effectively absorbed and the noise produced by the spring can be effectively reduced.

In this embodiment, the load 70 can be a fluid generating device with a plurality of blades such as a fan of an electric apparatus such as a ventilation fan or a range hood, or an impeller of a pump such as a drain pump or a circulation pump used in a washing machine or dishwasher. The driven member 50 of the torque transmission mechanism 30 drives the fan or impeller to rotate.

Figure 6:
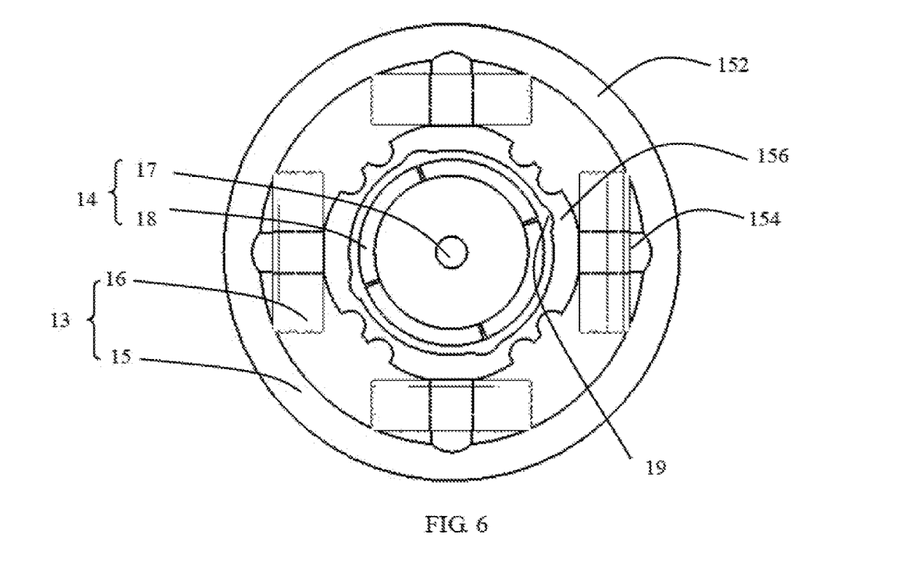
FIG. 6 illustrates an inner rotor permanent magnet brushless motor utilized in the above embodiment.

FIG. 6 illustrates a single phase permanent magnet brushless motor 10 utilized in the above embodiment. The motor is of an inner rotor type. The motor 10 includes a stator 13 and a rotor 14. The stator 13 includes a stator core such as a laminated stator core 15 and a winding 16 wound around the stator core 15. The rotor 14 includes a rotary shaft 17 and permanent magnetic poles 18. Outer surfaces of the permanent magnetic poles 18 confront the stator core 15 with an air gap formed there between to allow the rotor to rotate relative to the stator. Preferably, the air gap is a substantially even air gap, i.e. most part of the outer surfaces of the permanent magnetic poles 18 are coaxial with most part of an inner surface of the stator core 15. The stator core 15 includes a yoke 152 and a plurality of stator teeth 154 extending inwardly from the yoke 152. Each of the stator teeth 154 comprises a tooth surface facing the rotor permanent magnetic pole, the tooth surface comprises a first section which is coaxial with the rotor and a second section forming a positioning slot 19 such that the rotor is capable of stopping at an initial position which deviates from a dead point (i.e. a center line of the permanent magnetic pole deviates from a center line of a corresponding stator tooth by an angle) when the stator windings 16 are not energized. In this embodiment, ends of the stator teeth 154 away from the yoke 152 are connected together to form a ring 156. The positioning slots 19 are formed in an inner surface of the ring 156. Preferably, the number of the teeth and the number of the positioning slots 19 are directly proportional to the number of the rotor permanent magnetic poles, and the stator teeth and the ring are integrally formed and are wound with the stator winding before being assembled to the yoke of the stator core. The motor further includes a position sensor 20 (FIG. 7) such as a Hall sensor or a photo sensor. The position sensor 20 is used to sense the position of the rotor.

Figure 7:
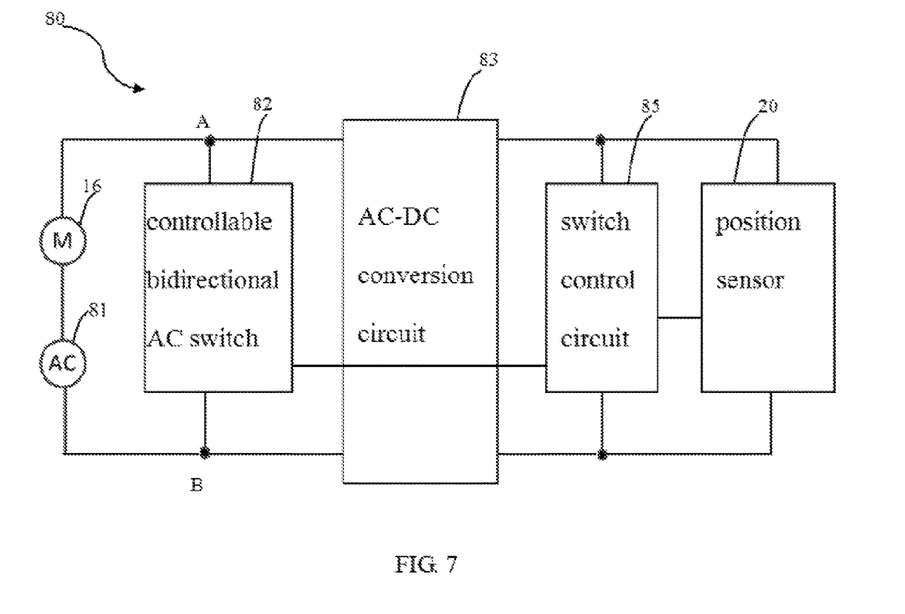
FIG. 7 is a block diagram showing a startup circuit of the motor of FIG. 6.

FIG. 7 is a block diagram showing a driving circuit 80 of the single phase permanent magnet brushless motor of the present invention. In the driving circuit 80, the stator windings 16 and an alternating current (AC) power 81 are connected in series between two nodes A and B. The AC power 81 is preferably a commercial AC power supply with a fixed frequency such as 50 Hz or 60 Hz and a supply voltage may be, for example, 110V, 220V or 230V. A controllable bidirectional AC switch 82 is connected between the nodes A and B, in parallel with the series-connected stator windings 16 and AC power 81. The bidirectional AC switch 82 is preferably a triode AC switch (TRIAC) having two anodes connected to the two nodes A and B, respectively. It should be understood that the controllable bidirectional AC switch 82 may be two silicon control rectifiers reversely connected in parallel, and control circuits may be correspondingly configured to control the two silicon control rectifiers in a preset way. An AC-DC conversion circuit 83 is connected between the two nodes A and B, in parallel with the switch 81. An AC voltage between the two nodes A and B is converted by the AC-DC conversion circuit 83 into a low voltage DC. The position sensor 20 may be powered by the low voltage DC power outputted from the AC-DC conversion circuit 83, for detecting the position of the magnetic poles of the permanent magnet rotor 14 of the synchronous motor 10 and outputting corresponding signals. A switch control circuit 85 is connected with the AC-DC conversion circuit 83, the position sensor 20 and the bidirectional AC switch 82, and is configured to control the bidirectional switch 82 to switch between a switch-on state and a switch-off state in a predetermined way, based on the magnetic pole position of the permanent magnet rotor and the polarity of the AC power source, such that the stator winding 16 urges the rotor to rotate only in the above-mentioned fixed starting direction during a starting phase of the motor. In this embodiment, in a case that the controllable bidirectional AC switch 82 is switched on, the two nodes A and B are short-circuited, and the AC-DC conversion circuit 83 does not consume electric energy because there is no electrical current flows through the AC-DC conversion circuit 83, hence, the utilization efficiency of electric energy can be improved significantly.

Figure 8:
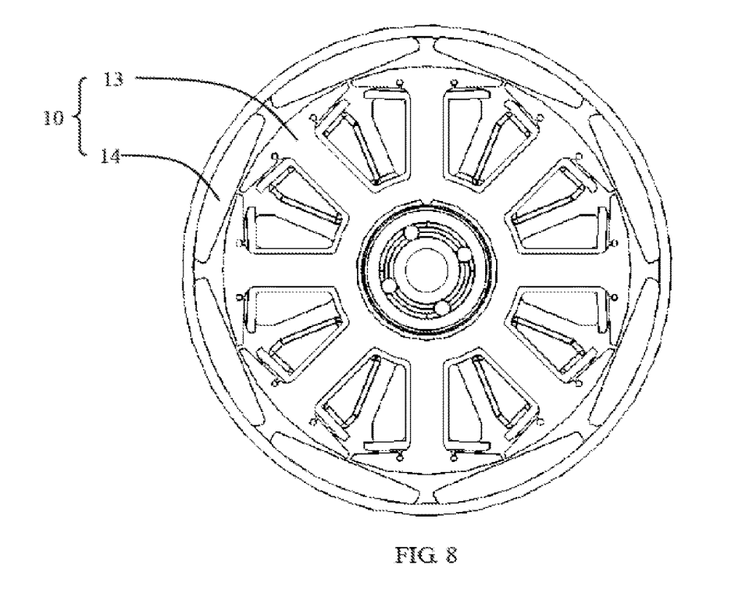
FIG. 8 illustrates an outer rotor permanent magnet brushless motor utilized in the above embodiment.

FIG. 8 illustrates another type of motor 10 utilized in the above embodiment. The motor 10 is of an outer rotor type, with the rotor 14 disposed surrounding the stator 13. An uneven air gap is formed between the permanent magnetic poles of the rotor and the stator core. Preferably, the air gap at each of the permanent magnetic poles is symmetrical about a center line of the each of the permanent magnetic poles, and has a radial width gradually increasing from a center toward two ends of the each of the permanent magnetic poles.

Figure 9:
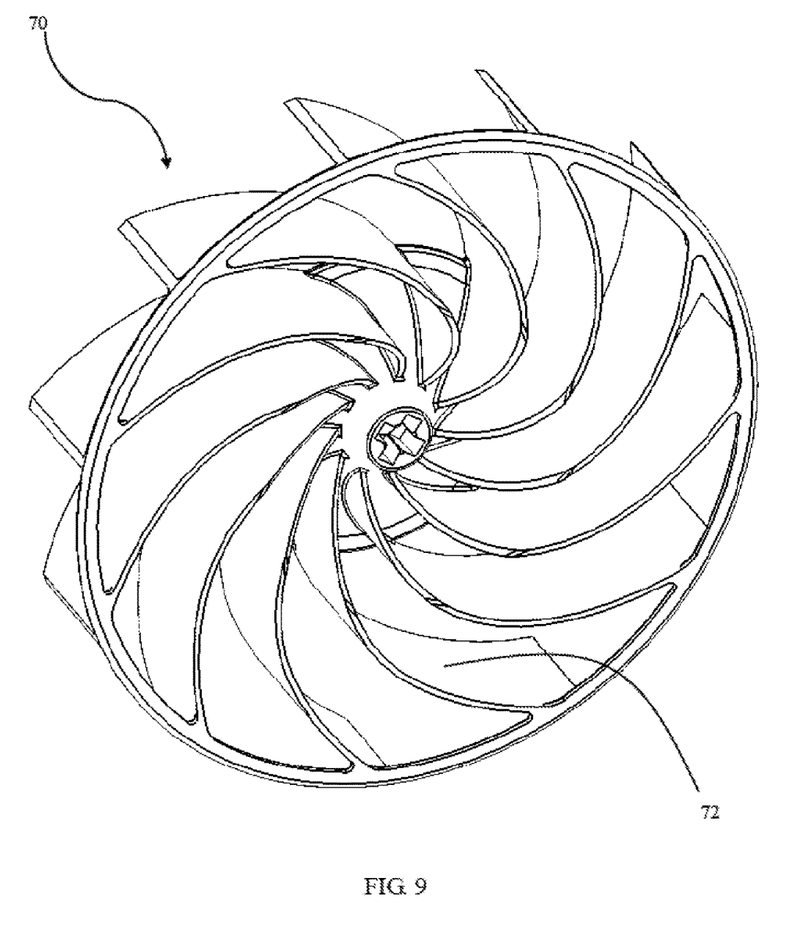
FIG. 9 illustrates an example of a fluid generating device driven by the motor driving assembly of FIG. 1.

FIG. 9 illustrates an example of the fluid generating device 70. In this embodiment, the fluid generating device 70 is an axial fan with a plurality of blades 72 used for bathroom fan, range hood and so on. Alternatively, the fluid generating device 70 may be an impeller with a plurality of blades used for a pump such as drain pump, circulation pump of a washing machine or dish washer.

Although the invention is described with reference to one or more preferred embodiments, it should be appreciated by those skilled in the art that various modifications are possible. For example, the motor may be of an inner rotor type or an outer rotor type. The air gap between the stator and rotor may be even or uneven. The material of the permanent magnet may be rare earth material or another material such as ferrite magnet. When the inner rotor motor is used, the permanent magnetic poles may be directly fixed to the rotary shaft of the rotor. Alternatively, the rotor core may be fixed to the rotary shaft, and then the permanent magnetic poles are fixed to an outer surface of the rotor core (i.e. surface mounted permanent magnetic poles), or are inserted into the rotor core (i.e. embedded permanent magnetic poles). Therefore, the scope of the invention is to be determined by reference to the claims that follow.

The invention claimed is:

1. A motor driving assembly comprising:
a single phase motor; and
a torque transmission mechanism comprising a driving member for being driven by the motor, a driven member for driving a load to rotate along a predetermined direction, and a connecting device comprising a resilient member which is in the shape of a spiral spring and a damping member, the resilient member comprising one end connected to the driving member and the other end connected to the driven member, the damping member being coated on an outer surface of the resilient member, or filled in a void of the resilient member in order to reduce noise generated by the resilient member;
wherein the driving member and the driven member are cooperative to form a receiving space therebetween, and an elastic pad is disposed on an axial side of the resilient member which is received in the receiving space.

2. The motor driving assembly of claim 1, wherein the single phase motor is a single phase permanent magnet direct current brushless motor or a single phase permanent magnet synchronous motor.

3. The motor driving assembly of claim 1, wherein the motor comprises an output shaft, the driving member is connected to the output shaft of the motor for synchronous rotation therewith, the driving member defines a receiving slot formed on one side and facing to the driven member, and the one end of the resilient member is received in the receiving slot.

4. The motor driving assembly of claim 3, wherein the driven member is in the shape of a plate or disc and defines a flange formed at an outer edge of the driven member, the flange defines a receiving slot, and the other end of the resilient member is received in the receiving slot of the driven member.

5. The motor driving assembly of claim 1, wherein the single phase motor comprises a stator, a permanent magnet rotor and a driving circuit, the stator comprises a stator winding adapted to be connected in series with an AC power source between a first node and a second node, the driving circuit comprises:
a controllable bidirectional AC switch connected between the first node and the second node;

an AC-DC conversion circuit connected in parallel with the controllable bidirectional AC switch between the first node and the second node;

a position sensor configured to detect a magnetic pole position of the permanent magnet rotor; and a switch control circuit configured to control the controllable bidirectional AC switch to be switched between a switch-on state and a switch-off state in a predetermined way, based on the magnetic pole position of the permanent magnet rotor and the polarity of the AC power source such that the stator winding drives the rotor to rotate only in the predetermined direction, wherein there is no current flowing through the AC-DC conversion circuit when the first node and the second node are short circuited by the controllable bidirectional AC switch.

6. The motor driving assembly of claim 1, wherein the motor comprises a rotor comprising a plurality of permanent magnetic poles, a stator comprising a stator core and a stator winding wound around the stator core, the stator core comprises a plurality of stator teeth, each of the stator teeth comprises a tooth surface facing the rotor permanent magnetic pole, the tooth surface comprises a first section which is coaxial with the rotor and a second section forming a positioning slot such that the rotor is capable of stopping at an initial position which deviates from a dead point.

7. The motor driving assembly of claim 1, wherein the motor comprises a rotor which is of an outer rotor type and comprising a plurality of permanent magnetic poles, a stator comprising a stator core and a stator winding wound around the stator core, the stator core comprises a plurality of stator tooth, each of the stator teeth comprises a tooth surface facing the rotor permanent magnetic pole, an uneven air gap is formed between the permanent magnetic poles and the tooth surface, and the air gap at each of the permanent magnetic poles is symmetrical about a center line of the each of the permanent magnetic poles.

8. The motor driving assembly of claim 7, wherein the air gap at each of the permanent magnetic poles has a radial width gradually increasing from a center to two ends of the each of the permanent magnetic poles.

9. A torque transmission mechanism comprising:
a driving member for being driven by an external force;
a driven member for driving a load to rotate along a predetermined direction; and
a connecting device comprising a resilient member which is in the shape of a spiral spring and a damping member, the resilient member comprising one end connected to the driving member and the other end connected to the driven member, the damping member being coated on an outer surface of the resilient member, or filled in a void of the resilient member;
wherein the driving member and the driven member are cooperative to form a receiving space, and an elastic pad is disposed on an axial side of the resilient member which is received in the receiving space.

10. The torque transmission mechanism of claim 9, wherein the driving member forms a first receiving slot formed on one side and facing to the driven member, the one end of the resilient member is received in the first receiving slot, the driven member is in the shape of a plate or disc and defines a flange formed at an outer edge of the driven member, the flange has a second receiving slot, and the other end of the resilient member is received in the second receiving slot.

11. An electric apparatus comprising:
a fluid generating device comprising a plurality of blades; and
a driving assembly for driving the fluid generating device to rotate, the driving assembly comprising:
a single phase motor; and
a torque transmission mechanism comprising a driving member for being driven by the motor, a driven member for driving the fluid generating device to rotate along a predetermined direction, and a connecting device comprising a resilient member which is in the shape of a spiral spring and a damping member, the resilient member comprising one end connected to the driving member and the other end connected to the driven member, the damping member being coated on an outer surface of the resilient member, or filled in void of the resilient member in order to reduce noise of the resilient member;
wherein the driving member and the driven member are cooperative to form a receiving space, and an elastic pad is disposed on an axial side of the resilient member which is received in the receiving space.

12. The electric apparatus of claim 11, wherein the single phase motor comprises a stator, a permanent magnet rotor and a driving circuit, the stator comprises a stator winding adapted to be connected in series with an AC power source between a first node and a second node, the driving circuit comprises:
a controllable bidirectional AC switch connected between the first node and the second node;
an AC-DC conversion circuit connected in parallel with the controllable bidirectional AC switch between the first node and the second node;
a position sensor configured to detect a magnetic pole position of the permanent magnet rotor; and
a switch control circuit configured to control the controllable bidirectional AC switch to be switched between a switch-on state and a switch-off state in a predetermined way, based on the magnetic pole position of the permanent magnet rotor and the polarity of the AC power source such that the stator winding drives the rotor to rotate only in the predetermined direction,
wherein there is no current flowing through the AC-DC conversion circuit when the first node and the second node are short circuited by the controllable bidirectional AC switch.

* * * * *